US005452515A

United States Patent [19]

Schilling

[11] Patent Number: 5,452,515

[45] Date of Patent: Sep. 26, 1995

[54] HAND CIRCULAR SAW WITH MITRE ADJUSTING DEVICE

[75] Inventor: Rainer Schilling, Stuttgart, Germany

[73] Assignee: Robert Bosch GmbH, Stuttgart, Germany

[21] Appl. No.: 170,424

[22] Filed: Dec. 20, 1993

[30] Foreign Application Priority Data

Jan. 2, 1993 [DE] Germany .......................... 43 00 033.9

[51] Int. Cl.$^{6}$ .............................. B23D 45/16; B27B 9/02

[52] U.S. Cl. .............................................. 30/376; 30/390

[58] Field of Search ............................ 30/375, 376, 388, 30/389, 390, 391, 374, 377; 83/581, 471.3, 473, 574, 698.31

[56] References Cited

U.S. PATENT DOCUMENTS

| | | | |
|---|---|---|---|
| 4,265,154 | 5/1981 | Batson | 83/581 X |
| 4,335,512 | 6/1982 | Sheps et al. | 30/376 |
| 4,856,394 | 8/1989 | Clowers | 30/376 X |
| 4,999,916 | 3/1991 | Sistare | 30/376 |
| 5,010,651 | 4/1991 | Techter et al. | 30/376 |
| 5,271,155 | 12/1993 | Fuchs et al. | 30/376 |

FOREIGN PATENT DOCUMENTS

| | | |
|---|---|---|
| 0466294 | 2/1991 | European Pat. Off. . |
| 3429095 | 1/1987 | Germany . |
| 8803627 | 6/1988 | Germany . |

*Primary Examiner*—Eugenia Jones
*Attorney, Agent, or Firm*—Michael J. Striker

[57] ABSTRACT

A hand circular saw comprises a base plate, a saw blade arranged so that at least one of an angle position of the saw blade and a miter angle is adjustable relative to the base plate, a clamping block supported by the base plate and provided with a turning guide slot, a clamping screw extending through the turning guide slot, and a supporting arm. The clamping block has a plurality of arresting pockets arranged along the turning guide slot, and the clamping screw carries at least one axially spring-biased displaceable arresting sleeve which is arrestingly positionable in a respective one of the arresting pockets.

12 Claims, 3 Drawing Sheets

0°
15°
22,5°
30°
45°

HAND CIRCULAR SAW WITH MITRE ADJUSTING DEVICE

BACKGROUND OF THE INVENTION

The present invention relates to a hand circular saw with a mitre adjusting device for adjusting mitre angles.

A hand circular saw with adjustable cutting depth is disclosed for example in U.S. Pat. No. 4,856,394. The cutting depth is determined here by the dimension, by which the saw blade projects under the base plate. It can be changed by turning the hand circular saw relative to the base plate around an axis extending parallel to the rotary axis of the saw blade and arrested in a desired position by clamping screws relative to the clamping block arranged on the base plate. For providing comfortable adjustment of the preferred cutting depth, abutments are arranged on the clamping blocks and define the corresponding preferred positions of the saw blade, so that the hand circular saw is supported on the abutments during the selection of the preferred cutting depth. The arrangement for the cutting depth adjustment is relatively bending-resistant and deformation-safe, since the axis for the cutting depth adjustment is short and determined by two bearing blocks arranged at a small distance of approximately 40 mm from one another. There is only a little danger that the saw blade during turning up and down for changing the cutting depth can be unintentionally moved from its position in a plane normal to the base plate. Then a change of the cutting depth adjustment results in alignment deviations of the saw blade from its nominal position.

The situation is however different during adjustment of the saw for a mitre cut. For this purpose the saw is turned about a turning axis parallel to the saw blade and the base plate. The turning axis is relatively long and the bearing blocks which support the turning axis are arranged at a relatively great distance from one another of at least 200 mm. Moreover, the gripping point for the hand of the operator during the inclination adjustment of the hand circular saw is remote from the bearing block or blocks. Thereby a long arm is produced and therefore due to the adjustment forces during the inclined adjustment, high rotary and bending moments are generated on the hand circular saw. This can lead to twisting or canting of parts which are generally composed of thin metal sheets, so that the hand circular saw is turned in a bearing block by 45° and in the opposite bearing block by 43°. Due to the thusly obtained play in the system for adjusting the mitre angle, the starting oblique positions of the saw blade relative to the base plate or to a predetermined cutting plane can occur. Such oblique positions will lead to oblique cutting edges and thereby to faulty saw cuts courses. The above described danger is characteristic especially for hand circular saws with coulisse guides for mitre angle adjustment, which have the advantage of not using a stable, solid turning axis so that the actual turning axis extends under the base plate or on the workpiece.

SUMMARY OF THE INVENTION

Accordingly, it is an object of the present invention to provide a hand circular saw with mitre angle adjusting device, which avoids the disadvantages of the prior art.

In keeping with these objects and with others which will become apparent hereinafter, one feature of the present invention resides, briefly stated, in a hand circular saw in which the clamping screw carries at least one axially spring biased displaceable arresting sleeve and is arrestingly positionable in a plurality of arresting pockets arranged along a turning guide slot on a clamping block.

When the hand circular saw is designed in accordance with the present invention, the several exact preferred mitre angle positions are easily adjustable and reliable against undesired displacements, and the saw blade is always in alignment relative to the base plate. The preferred mitre angle position is reliably adjusted by arresting of the turning arm which carries the hand circular saw relative to the clamping block fixedly arranged on the base plate.

In accordance with another advantageous feature of the present invention, two clamping blocks are arranged for better stability of the mitre angle adjustment, so that the adjustment of each exact mitre angle is secured on both clamping blocks simultaneously in a form-locking manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 4 and 5 are views showing further embodiments of the present invention, wherein FIG. 4 is a plan view from inside and FIG. 5 is a cross-section; and FIG. 6 is a partial view of FIG. 4 from outside.

DESCRIPTION OF THE PREFERRED EMBODIMENTS

Figure 1:
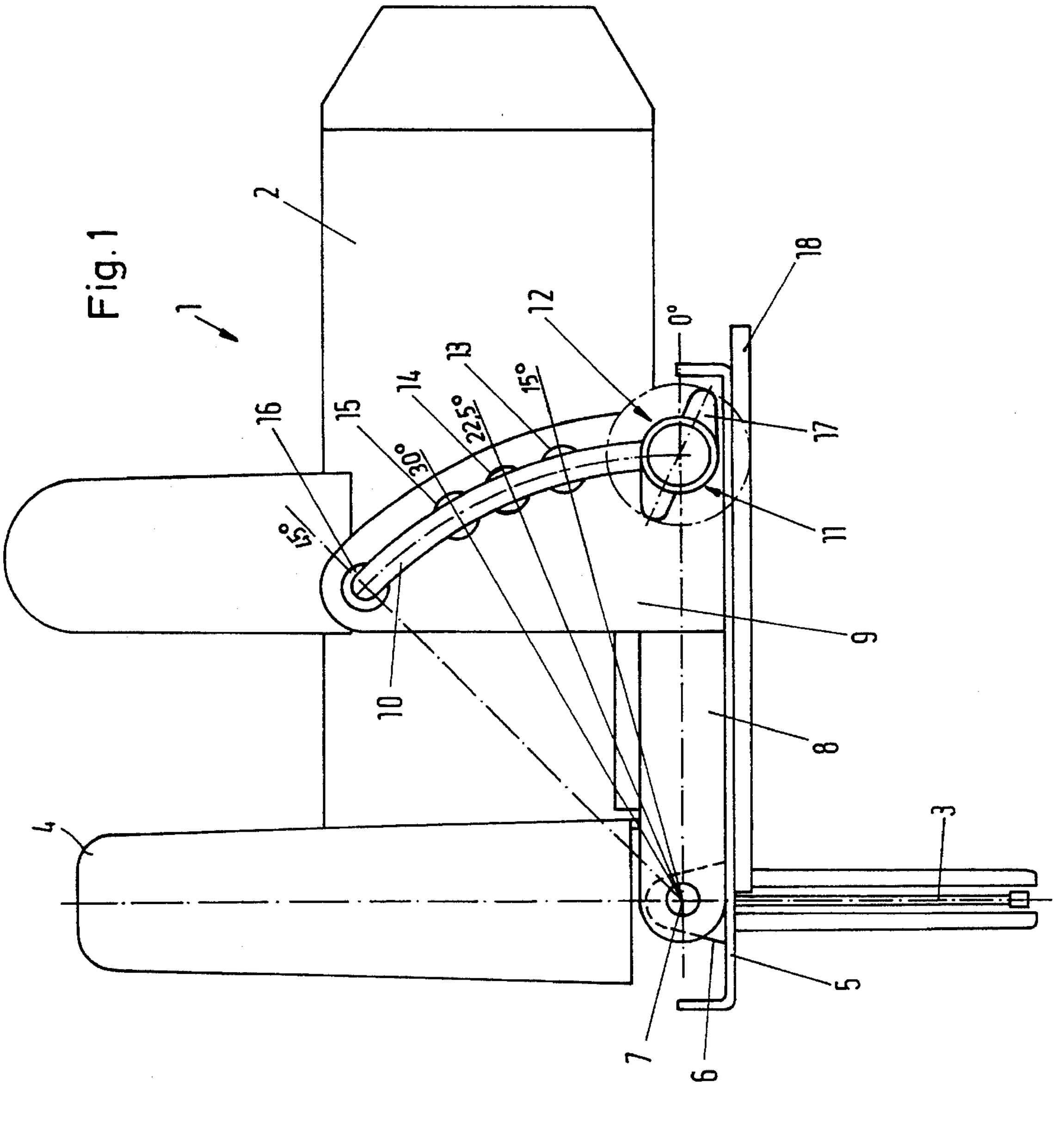
FIG. 1 is a front view of a hand circular saw with a mitre angle adjusting device in accordance with the present invention.

A hand circular saw in accordance with the present invention is identified in FIG. 1 as a whole with reference numeral 1. The hand circular saw has a motor housing 2, a saw blade 3, a saw blade housing 4, a base plate 5 and a rotary bearing block 6. A turning axle 7 is arranged in the rotary bearing block 6. A turning arm 8 is turnable around the turning axis 7 and carries the saw blade housing 4 together with the motor housing 2. The base plate 5 carries a clamping block 9 with a turning guide slot 10. A clamping screw 11 extends transversely through the turning arm 8 and the turning guide slot 10. The clamping screw 11 is secured at its free end from rotation by a wing nut 17 and is axially pretensioned relative to the turning arm 8 and the clamping block 9.

The turning guide slot 10 has five curved arresting pockets 12, 13, 14, 15, 16, in which a part of the clamping screw 11 can engage in an axial direction. The turning guide slot 10 is curved in a circular arc-shape around the turning axis 7. Thereby during turning of the hand circular saw 1, the clamping screw 11 together with the turning arm 8 are displaced along the turning guide slot 10. In any intermediate position or in a preselected arresting position of the arresting pockets 12–16, the turning arm can be arrested by fixing the wing nut 17 and thereby the mitre angle adjustment can be fixed.

The hand circular saw 1 abuts with its base plate 5 on a workpiece 18. With the saw blade 3 in a vertical alignment relative to the base plate 5 and with the abutment of the turning arm 8 on the base plate 5, it can be recognized that the mitre angle adjustment is 0° .

Figure 3:
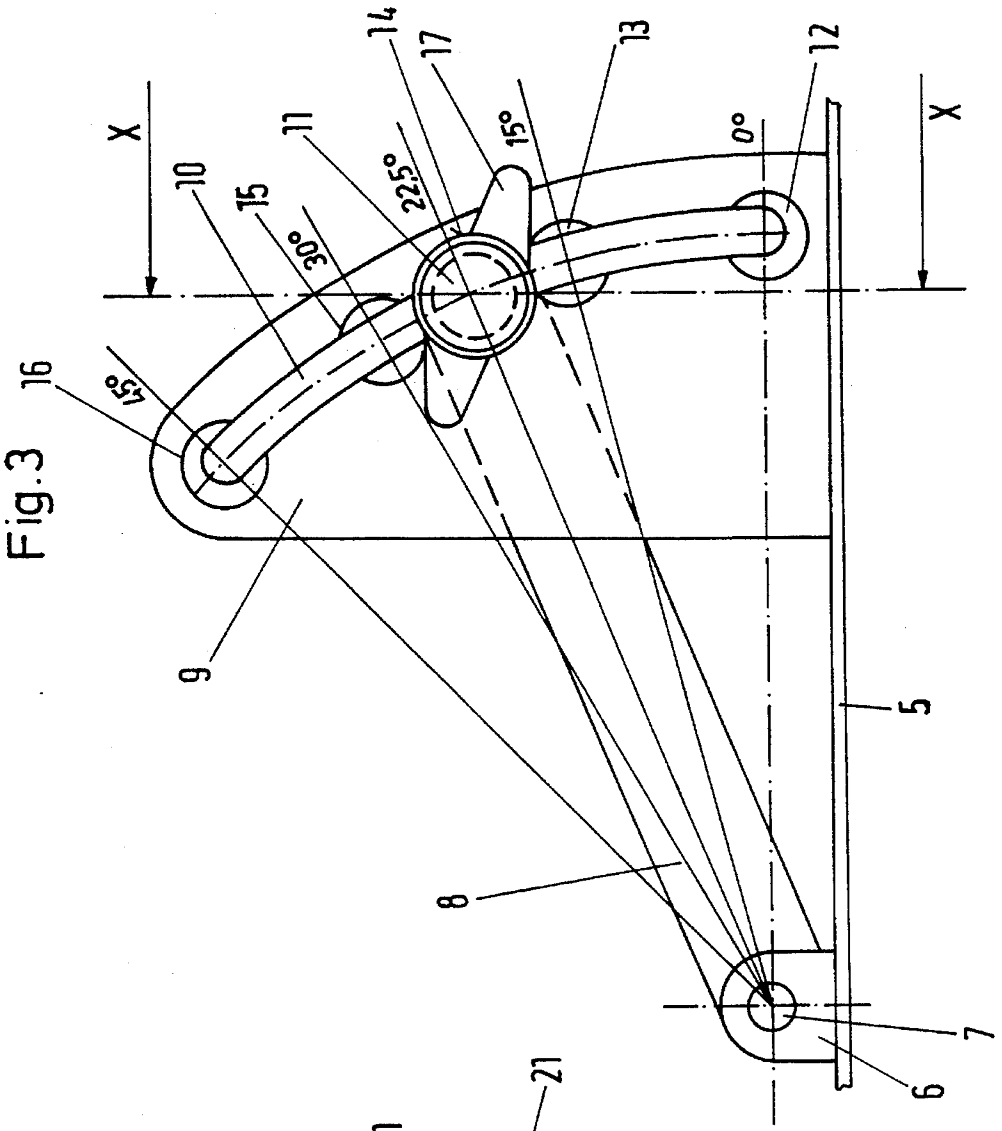
FIG. 3 is a plan view of the device shown in FIG. 2.
Figure 2:
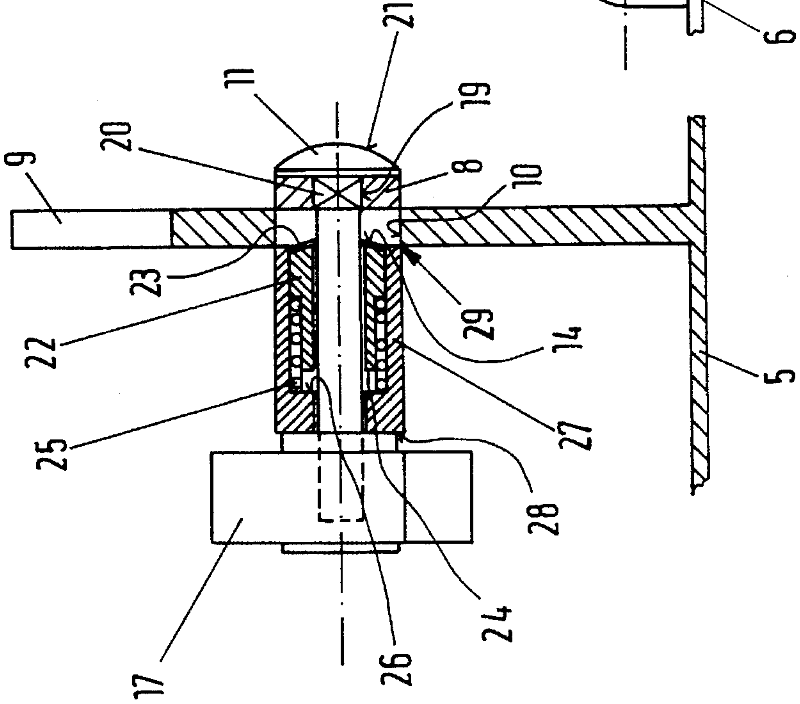
FIG. 2 is a view showing the mitre angle adjusting device of FIG. 1, in a cross-section.

FIGS. 2 and 3 show a fragment of FIG. 1 which includes the base plate 5 with the clamping block 9 and also the clamping screw 11 with the wing nut 17 in a cross-section and in a side view, on an enlarged scale. It can be seen how the clamping screw 11 extends through the turning arm 8 or its opening 19, the clamping block 9 or its turning guide slot 10, so that the turning arm 8 is displaceable together with the clamping screw 11 in the turning guide slot 10. The turning arm 8 therefore is located without play laterally against the clamping block 9.

The clamping screw 11 is arranged through a four-cornered structure 20 on the shaft near its head 21 for joint rotation with the turning arm 8. At the side of the clamping block 9 which is opposite to the turning arm 8, an axially displaceable arresting sleeve 22 is guided between the clamping block 9 and the wing nut 17 through the clamping screw 11. It has a calotte-shaped curved end surface 23 which corresponds to the curved arresting pockets 12–16 so that the arresting sleeve 22 can be engaged in them. The arresting sleeve 22 is supported with the curved end surface 23 on the clamping block 9 in the arresting pocket 14 in the turning guide slot 10. A spring 25 is pretensioned and supported against the end surface 24 of the arresting sleeve 22 which end surface faces away from the end surface 23. At the rear side the spring 25 is supported at the side facing the end surface 24 and abuts an inner end surface 26 of a clamping sleeve 27. The clamping sleeve 27 is arranged rotatably and axially displaceably on the clamping screw 11. It abuts with its left end as considered in the observation direction against the wing nut 17 which is screwed on the clamping screw 11. Moreover, the clamping sleeve 26 abuts with its end 29 which faces away from the wing nut 17, laterally against the clamping block 9 along the turning guide slots 10. As can be seen from FIG. 2 the spring 25 and the arresting sleeve 22 are guided in the interior of the clamping sleeve 27 in a non-detachable axially displaceable fashion.

The side view shown in FIG. 3 clearly illustrates the connection between the clamping screw 11 and the turning arm 8. A hand circular saw which is adjustable with the turning arm 8 is not illustrated here. Also, the arrangement of the arresting pockets 12–16 and the associated preferred mitre angles from 0° to 45° is clearly illustrated. It can be seen that the base plate 5 with the rotary bearing block 6 and the clamping block 9 form the frame-fixed part, while the turning arm 8 together with the clamping screw 11, the arresting sleeve 22, the spring 25, the clamping sleeve 27 and the wing nut 17 are turnable relative to the turning axis 7 along the turning guide slot 10 and form a movable part. The mitre angle adjusted between the base plate 5 and the turning arm 8 amounts to 22.2°. The arrows X—X show the cutting direction which corresponds to the cross-section of FIG. 2.

For changing the mitre angle, the wing nut 17 is released so that the clamping connection between the clamping sleeve 27 and the clamping block 9 is released. Thereby the force-transmitting arresting is released as well. Only the form-locking arresting is maintained. During displacement of the turning arm 8 together with the clamping screw 11 along the turning guide slot 10, a relative movement between the arresting parts 12, 13, 14, 15, 16; 22 is performed. The arresting sleeve 22 which is preselectively arrested by the arresting pockets 12–16 slides non-arrestingly along the turning guide slot 10 to the desired mitre angle position. There the wing nut 17 is again tightened, so that the clamping sleeve 27 arrests the clamping screw 11 together with a turning arm 8 again relative to the clamping block 9. The arresting sleeve 22 is loaded by the spring 25 in direction of the turning guide slot 10 and comes to abutment either only in a force-transmitting manner at its edges or, when one of the arresting pockets 12–16 is reached, in an arresting manner.

The same construction and the same functions are obtained when in accordance with the prior art when the hand circular saws of the prior art provided with two turning arms and two clamping blocks are used in the invention in a multi-arrangement.

When a physical, hinge-like turning axis 7 is dispensed with, then the turning guide slot 10 of the clamping block 9 which is curved around the turning axis extending under the base plate 5 as shown in FIGS. 1–3, can form a coulisse guide with a coulisse-block type part which is guided in the slot and can secure an exact mitre angle position with the arresting parts as described above.

Figures 4, 5, 6:
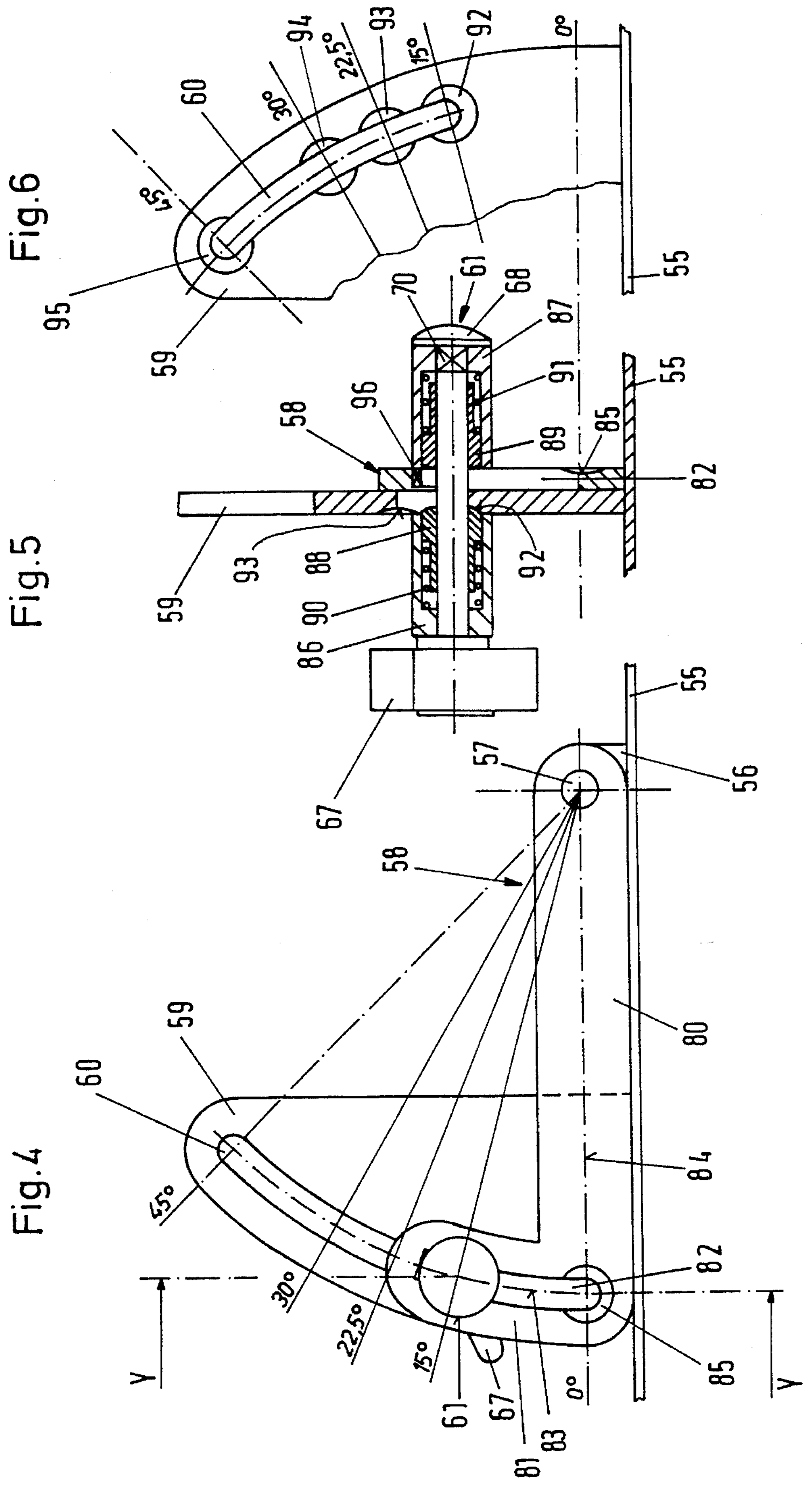

FIG. 4 shows a further embodiment of the mitre angle adjusting device of FIG. 3, but in reverse observation position. A base plate 55 with a rotary bearing block 56 and the clamping block 59 as well as the clamping screw 61 substantially correspond to the respective parts of FIG. 3. In contrast to FIG. 3, a turning arm 58 has an L-shaped contour. Its longer leg 80 with its one end is arranged turnably on the rotary bearing 56 about the turning axis 57. A shorter leg 81 is provided, instead of a circular opening, with an elongated opening 82 corresponding to the turning guide slot 60. The elongated opening 82 is dimensioned so that the clamping screw 61 is displaceable to angular positions over a short angle 81 from 0° to 15°.

In the point of intersection between the elongated opening axis 83 and a line 84 extending parallel to the base plate 55 through the turning axis 57, a further arresting pocket 85 is arranged on the leg 81 at its side facing away from the clamping block 59. The arrows Y—Y show the cutting direction for the view of FIG. 5.

The clamping screw 61 is displaceable in the elongated opening 82 and simultaneously in the turning guide slot 60. Thereby with a mitre angle of 0° the clamping screw 61 can be left in a position farther of the base plate 55 and the mitre angle of 0° is arrested. The wing nut 67 can be simply tightened or released without striking against the base plate 55.

The cross-section of FIG. 4 shown in FIG. 5 illustrates the principle coordination between FIGS. 3 and 4. What is different here is the arrangement of the short angle 81 with the arresting pocket 85 as well as a double arrangement of the clamping sleeve 86, 87 with the arresting sleeves 88, 89 and the spring 90, 91 at the left side and at the right side of the clamping block 59 on the clamping screw 61. In order to prevent the rotation of the clamping screw 61 relative to the clamping block 59, a four-cornered structure 70 is provided between the head 68 of the clamping screw 61 and the right clamping sleeve 87, and the projection 96 is provided on the clamping sleeve 87 which eccentrically engages in the elongated opening 82.

A view of FIG. 6 facilitates the understanding of the operation of the arrangement of FIGS. 4 and 5. FIG. 6 shows the detail of the clamping block 59 with the shortened turning guide slot 60 as compared with the embodiment of FIGS. 1, 2, 3 and the arresting pockets 92–95 in the angular region between 15° and 45° . With the adjusted mitre angle of 0° in accordance with FIGS. 4 and 5, the clamping screw 61 extends in the turning guide slot 60 in an angular position of 15° and also in the elongated opening 72 at 15° . Therefore the left arresting sleeve 88 is arrested in the lowermost arresting pocket 92. The left clamping sleeve 86 is supported against the edges of the turning guide slot 60. The right clamping sleeve 87 arranged on the opposite side of the clamping block 59 and the arresting sleeve 89 are supported laterally of the elongated opening 63 on the short leg 81 in the upper end position of the elongated opening 82. There no arresting pocket is arranged.

The spring 90 of the left arresting sleeve 88 is dimensioned weaker than the spring 91 of the right arresting sleeve 89.

After the release of the wing nut 67 for adjusting the hand circular saw or turning arm 58 from the shown mitre angle position 0° to a mitre angle position greater than 0°, the left arresting sleeve 88 first is fixed in the arresting pocket 92 of the clamping block 59. The turning arm 58 slides with the elongated opening 82 on the clamping screw 61 and the right clamping sleeve 87 or the arresting sleeve 89 and on the clamping block 59 until the right arresting sleeve 89 is engaged in the arresting pocket 85 of the short leg 81 at the lower end of the elongated opening 82. In this case a turning arm 58 moves together with the hand circular saw without taking the clamping screw 61 along relative to the clamping block 59.

During a further upward turning of the circular saw in direction of 45° turning angle position, the left arresting sleeve 88 offers due to the weaker spring 90 only a lower over-arresting resistance, while the right sleeve 89 due to the stronger spring 91 is fixed in the pocket 85 on the clamping block 59. Thereby the clamping screw 61 moves inside the mitre angle adjustment region of 15°–45° upwardly and downwardly always with the turning arm 58 or with the hand circular saw.

During adjustment of the mitre angle position from 45° to 0°, the clamping screw 61 abuts finally against the lower end of the turning guide slot 61 in the 15° angular position. There the left arresting sleeve 88 engages in the arresting pocket 92, the right arresting sleeve 89 disengages from the arresting pocket 85, and the short leg 81 of the turning arm 58 can slide with the clamping screw 61 with its elongated opening 82 engagingly on the clamping block 59 along the 0° angular position until the turning arm 58 abuts against the base plate 55.

It will be understood that each of the elements described above, or two or more together, may also find a useful application in other types of constructions differing from the types described above.

While the invention has been illustrated and described as embodied in a hand circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand circular saw, comprising a base plate; a saw blade arranged so that an angle position of said saw blade is adjustable relative to said base plate; a clamping block supported by said base plate and provided with a curved turning guide slot; a clamping screw extending through said turning guide slot; and a turning arm which carries said saw blade and is displaceable together with said clamping screw along said turning guide slot, said clamping block has a plurality of curved arresting pockets arranged along said turning guide slot, and said clamping screw carrying a first axially spring-biased displaceable arresting sleeve which has a curved end surface arrestingly positionable in a respective one of said curved arresting pockets so as to angularly adjust said saw blade relative to said base plate and to arrest said saw blade in any of a plurality of angular positions relative to said base plate.

2. A hand circular saw as defined in claim 1, wherein said curved end surface of said first arresting sleeve is calotte-shaped.

3. A hand circular saw as defined in claim 1, wherein said clamping screw is formed so that it is secured against rotation relative to said turning arm.

4. A hand circular saw as defined in claim 3, wherein said clamping screw is secured against rotation by means of a form-locking connection with said turning arm.

5. A hand circular saw as defined in claim 1; and further comprising at least one clamping sleeve engaging over said first arresting sleeve and fixing said turning arm relative to said clamping block in a force-transmitting and releasable fashion.

6. A hand circular saw as defined in claim 1; and further comprising a clamping sleeve in which said first arresting sleeve is guided; and a spring which loads said first arresting sleeve so that an end surface of said first arresting sleeve is displaceable toward said clamping block.

7. A hand circular saw as defined in claim 1, wherein said turning guide slot in said clamping block is formed for an angular region of 15° to 45°, said turning arm having an elongated opening formed for passing said clamping screw over an angular region of 0°–15°.

8. A hand circular saw as defined in claim 7, wherein said elongated opening has an end and a further arresting pocket provided at said end.

9. A hand circular saw as defined in claim 8, wherein said end of said elongated opening is a lower end, said further arresting pocket is provided in said lower end of said elongated opening.

10. A hand circular saw, comprising a base plate; a saw blade arranged so that an angle position of said saw blade is adjustable relative to said base plate; a clamping block supported by said base plate and provided with a turning guide slot; a clamping screw extending through said turning guide slot; and a turning arm which carries said saw blade and is displaceable together with said clamping screw along said turning guide slot, said clamping block has a plurality of arresting pockets arranged along said turning guide slot, and said clamping screw carrying a first axially spring-biased displaceable arresting sleeve which is arrestingly positionable in a respective one of said arresting pockets, said first arresting sleeve being laterally supported on said clamping block; and a second substantially identical arresting sleeve arranged opposite to said first arresting sleeve and supported on said turning arm on a side of said turning arm facing away from said clamping block.

11. A hand circular saw as defined in claim 14; and further comprising a first spring and a second spring, said first prestresses said second arresting sleeve and is stronger than said second spring, while said second spring prestresses said first-mentioned arresting sleeve and is weaker than said first spring.

12. A hand circular saw, comprising a base plate; a saw blade arranged so that an angle position of said saw blade is adjustable relative to said base plate; a clamping block supported by said base plate and provided with a turning guide slot; a clamping screw extending through said turning guide slot; and a turning arm which carries said saw blade and is displaceable together with said clamping screw along said turning guide slot, said clamping block has a plurality of arresting pockets arranged along said turning guide slot, and said clamping screw carrying a first axially spring-biased displaceable arresting sleeve which is arrestingly positionable in a respective one of said arresting pockets, said first arresting sleeve being laterally supported on said clamping block; and a second substantially identical arresting sleeve arranged opposite to said first arresting sleeve and supported on said turning arm on a side of said turning arm facing away from said clamping block, said turning arm having an elongated opening provided for passing of said clamping screw and having a further arresting pocket in which said second arresting sleeve is engaged.

* * * * *